United States Patent
Zhang et al.

(10) Patent No.: US 9,531,498 B2
(45) Date of Patent: Dec. 27, 2016

(54) LINK ADAPTATION IN A COMMUNICATION NETWORK

(75) Inventors: Hongyuan Zhang, Fremont, CA (US); Yong Liu, Campbell, CA (US); Raja Banerjea, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 547 days.

(21) Appl. No.: 13/215,730

(22) Filed: Aug. 23, 2011

(65) Prior Publication Data

US 2012/0051246 A1     Mar. 1, 2012

Related U.S. Application Data

(60) Provisional application No. 61/379,322, filed on Sep. 1, 2010, provisional application No. 61/411,857, filed on Nov. 9, 2010, provisional application No. 61/416,154, filed on Nov. 22, 2010, provisional application No. 61/430,379, filed on Jan. 6, 2011, provisional application No. 61/451,431, filed on Mar. 10, 2011.

(51) Int. Cl.
*H04J 3/16*     (2006.01)
*H04L 1/00*     (2006.01)

(52) U.S. Cl.
CPC .................. *H04L 1/0001* (2013.01)

(58) Field of Classification Search
CPC .... H04L 1/0001; H04L 1/0006; H04L 1/0009; H04L 1/001; H04L 1/0015; H04L 1/0023; H04L 1/0028; H04L 1/0029; H04L 1/003
USPC ..... 370/230, 230.1, 231–232, 235–236, 252, 370/236.1–236.2, 345, 348, 389, 392, 370/437, 443,370/465, 468, 473–474, 476

See application file for complete search history.

(56) References Cited

U.S. PATENT DOCUMENTS

| | | | |
|---|---|---|---|
| 6,490,243 B1 * | 12/2002 | Tanaka | H03M 13/00 370/216 |
| 7,023,798 B2 * | 4/2006 | Bourlas et al. | 370/230 |
| 7,376,091 B1 | 5/2008 | Eccles et al. | |
| 7,599,332 B2 | 10/2009 | Zelst et al. | |
| 7,729,439 B2 | 6/2010 | Zhang et al. | |
| 7,742,390 B2 | 6/2010 | Mujtaba | |
| 7,898,948 B2 * | 3/2011 | DiGirolamo et al. | 370/230 |

(Continued)

FOREIGN PATENT DOCUMENTS

| | | |
|---|---|---|
| CN | 101444048 A | 5/2009 |
| CN | 101517995 A | 8/2009 |

(Continued)

OTHER PUBLICATIONS

International Search Report in corresponding PCT/US2011/048795 mailed Jun. 60, 2012.

(Continued)

*Primary Examiner* — Kevin Mew

(57) ABSTRACT

In a method for link adaptation in a network, a link quality metric corresponding to a wireless communications link between a first communication device and a second communication device is determined. A communication frame having a header is generated. The header includes i) a first subfield of a control field to specify a modulation and coding scheme for use via the wireless communications link, and ii) a second subfield of the control field that includes the link quality metric. The communication frame is transmitted.

16 Claims, 12 Drawing Sheets

(56) References Cited

U.S. PATENT DOCUMENTS

| | | | |
|---|---|---|---|
| 8,144,647 | B2 | 3/2012 | Nabar et al. |
| 8,155,138 | B2 | 4/2012 | van Nee |
| 8,213,870 | B2 | 7/2012 | Zhang et al. |
| 8,270,359 | B2* | 9/2012 | Nangia et al. ............... 370/329 |
| 8,284,686 | B2* | 10/2012 | Gu ..................... H04B 7/0608 370/252 |
| 8,289,869 | B2 | 10/2012 | Sawai |
| 8,498,267 | B2* | 7/2013 | Choi-Grogan et al. ...... 370/331 |
| 8,526,351 | B2 | 9/2013 | Fischer et al. |
| 8,599,900 | B2* | 12/2013 | Zhang ................. H04J 13/102 370/252 |
| 8,619,907 | B2 | 12/2013 | Mujtaba et al. |
| 8,644,368 | B1 | 2/2014 | Zhang et al. |
| 8,665,767 | B2* | 3/2014 | Sampath ............... H04L 1/0003 370/312 |
| 8,711,779 | B2 | 4/2014 | Basson et al. |
| 8,724,720 | B2 | 5/2014 | Srinivasa et al. |
| 8,787,342 | B2* | 7/2014 | Huber et al. ................. 370/338 |
| 8,891,597 | B1 | 11/2014 | Zhang et al. |
| 8,971,178 | B1 | 3/2015 | Nabar et al. |
| 2007/0129018 | A1* | 6/2007 | Trainin et al. ................. 455/69 |
| 2008/0130617 | A1 | 6/2008 | Singh et al. |
| 2008/0250294 | A1 | 10/2008 | Ngo et al. |
| 2009/0196163 | A1 | 8/2009 | Du |
| 2009/0290563 | A1* | 11/2009 | Gu et al. ....................... 370/338 |
| 2010/0014500 | A1* | 1/2010 | Lee et al. ...................... 370/342 |
| 2010/0046656 | A1 | 2/2010 | van Nee et al. |
| 2010/0067367 | A1* | 3/2010 | Choi et al. .................... 370/210 |
| 2010/0074195 | A1* | 3/2010 | Cheng et al. .................. 370/329 |
| 2010/0103920 | A1* | 4/2010 | Damnjanovic et al. ...... 370/344 |
| 2010/0329195 | A1* | 12/2010 | Abraham et al. ............. 370/329 |
| 2011/0002219 | A1 | 1/2011 | Kim et al. |
| 2011/0051647 | A1* | 3/2011 | Sampath ............... H04L 1/0003 370/312 |
| 2011/0128929 | A1 | 6/2011 | Liu et al. |
| 2012/0063439 | A1* | 3/2012 | Seok ................. H04W 72/0406 370/338 |
| 2012/0207192 | A1* | 8/2012 | Zhang et al. ................. 375/135 |
| 2012/0314570 | A1* | 12/2012 | Forenza et al. ............... 370/230 |
| 2012/0327804 | A1* | 12/2012 | Park .................... H04W 52/146 370/252 |
| 2013/0010632 | A1* | 1/2013 | Wang ................... H04B 17/309 370/252 |
| 2013/0028122 | A1* | 1/2013 | Ma ....................... H04B 7/2606 370/252 |
| 2013/0028307 | A1* | 1/2013 | Ren et al. ..................... 375/224 |
| 2013/0215985 | A1* | 8/2013 | Lee et al. ...................... 375/261 |
| 2014/0321479 | A1* | 10/2014 | Zhang et al. ................. 370/474 |

FOREIGN PATENT DOCUMENTS

| | | | |
|---|---|---|---|
| JP | 2003-324407 | A | 11/2003 |
| JP | 2007-295257 | A | 11/2007 |
| JP | 2008-526093 | A | 7/2008 |
| JP | 2009-512363 | A | 3/2009 |
| JP | 2009-540662 | A | 11/2009 |
| WO | WO-2006/071052 | A1 | 7/2006 |
| WO | WO-2007/142482 | A1 | 12/2007 |
| WO | WO 2007142482 | A1 * | 12/2007 |
| WO | WO-2008/018690 | A1 | 2/2008 |
| WO | WO-2008/056916 | A1 | 5/2008 |
| WO | WO-2009-055662 | A2 | 4/2009 |
| WO | WO-2009/088364 | A1 | 7/2009 |

OTHER PUBLICATIONS

Written Opinion in corresponding PCT/US2011/048795 mailed Jun. 12, 2012.
International Preliminary Report on Patentability in corresponding PCT/US2011/048795 mailed Mar. 14, 2013.
Pyo et al., "Throughput Analysis and Improvement of Hybrid Multiple Access in IEEE 802.13.3c mm-wave WPAN," IEEE Journal on selected Areas in Communications, IEEE Service Center, Piscataway, NJ US 27(8), 1414-1424, Oct. 1, 2009.
Zhang et al., "VHT Link Adaptations IEEE802.11-11/0047r0," IEEE 802.11-11, 125th IEEE 802.11 Wireless Local Area Networks Session, Interim Meeting Session, Hyatt Centruy Plaza Hotel, Los Angeles, California, 1-11, Jan. 18, 2011.
Merlin et al., "VHT Control and Link Adaptation, IEEE 802.11-11/0040r0," IEEE 802.22-11, 125th IEEE 802.11 Wireless Local Area Networks Session, Interim Meeting Session, Hyatt Centruy Plaza Hotel, Los Angeles, California, 1-15, Jan. 18, 2011.
Fisher et al., "Link Adaptation Subfield for VHT, IEEE 802.11-10/1095r0" IEEE 802.11-10, 123rd IEEE 802.11 Wireless Local Area Networks session, Interim Meeting Session, Hilton Waikoloa Village, 1-5, Sep. 12, 2010.
International Standard, ISO/IEC 8802-11, ANSI/IEEE Std 802.11, "Information technology-Telecommunications and information exchange between systems-local and metropolitan area networks-specific requirements" Part 11: Wireless LAN Medium Access Control (MAC) and Physical Layer (PHY) specifications, *The Institute of Electrical and Electronics Engineers, Inc.*, (1999).
IEEE Std 802.11a-1999 (Supplement to IEEE Std 802.11-1999) "Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).
IEEE Std 802.11a-1999 (R2003) (Supplement to IEEE Std 802.11-1999) "Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.
IEEE Std 802.11b-1999 (Supplement to ANSI/IEEE Std 802.11, 1999 Edition) "Supplement to IEEE Standard for Information technology-Telecommunications and information exchange between systems-Local and metropolitan area networks-Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.
IEEE std 802.11b-1999/Cor 1-2001 (Corrigendum to IEEE Std 802.11b-1999) "IEEE Standard for Information technology-Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigedum 1," *The Institute of Electrical and Electronics Engineers, Inc.*, 23 pages, Nov. 7, 2001.
IEEE Std 802.11g/D2.8, May 2002 (Supplement to ANSI/IEEE Std 802.11, 1999 Edition) "Draft Supplement to Standard [for] Information technology-Telecommunications and information exchange between systems-Local and metropolitan area networks-Specific requirements-Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.
IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.
IEEE Std 802.11-2007 (revision of IEEE Std. 802.11-1999) "Information Standard for Information technology-Telecommunications and information exchange between systems-Local and metropolitan area networks-Specific requirements" Part 11: Wireless LAN

(56) References Cited

OTHER PUBLICATIONS

Medium Access Control (MAC) and Physical Layer (PHY) Specifications, *The Institute of Electrical and Electronics Engineers, Inc.*, (Jun. 12, 2007).
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.
S. A. Mujtaba, "IEEE P802.11-Wireless LANs, TGn Sync Proposal Technical Specification," *The Institute of Electrical and Electronics Engineers, Inc.*, doc.: IEEE 802.11-04/0889r6, May 2005.
"IEEE P802.11n™/D3.00, Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11n™ IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
van Nee, et al. "The 802.11n MIMO-OFDM Standard for Wireless LAN and Beyond," Wireless Personal Communications, vol. 37, pp. 445-453 (Jun. 2006).
Stacey et al., "IEEE P802.11, Wireless LANs, Proposed TGac Draft Amendment," Institute of Electrical and Electronics Engineers, doc. No. IEEE 802.11-10/1361r3 (Jan. 2011).
Stacey et al., "Specification Framework for TGac," document No. IEEE 802.11-09/0992r20, *Institute for Electrical and Electronics Engineers*, pp. 1-49, Jan. 18, 2011.
Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Shi et al., "Phase Tracking During VHT-LTF," Doc. No. IEEE 802.11-10/07711-0, *The Institute of Electrical and Electronics Engineers, Inc.*, Jul. 2010.
van Zelst et al., "Pilot Sequence for VHT-DATA," Doc. No. IEEE 802.11-10/0811r1, *The Institute of Electrical and Electronics Engineers, Inc.*, Jul. 2010.
Zhang et al., "11ac Explicit Sounding and Feedback", *The Institute of Electrical and Electronics Engineers*, doc. No. IEEE 802.11-10/1105r0, (Sep. 2010).
Love et al., "An Overview of Limited Feedback in Wireless Communication Systems," IEEE J. on Selected Areas in Communications, vo. 26, No. 8, Oct. 2008.
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Office Action in Chinese Application No. 201180047862.4, dated May 14, 2015 (10 pages).
Notice of Reasons for Rejection in Japanese Application No. 2013-527115, dated Jun. 2, 2015, with English translation (4 pages).
Notice of Reasons for Rejection in Japanese Patent Application No. 2013-527115, dated Nov. 4, 2015, with English translation (4 pages).
Second Office Action in Chinese Application No. 2011800478624, dated Jan. 14, 2016, with English translation (13 pages).
Partial translation of Second Office Action in Chinese Application No. 2011800478624, dated Jan. 14, 2016 (12 pages).
Summary of the Second Office Action in Chinese Application No. 2011800478624, dated Jan. 14, 2016 (1 page).
Third Office Action in Chinese Application No. 201180047862.4, dated Aug. 26, 2016, with English translation (9 pages).

* cited by examiner

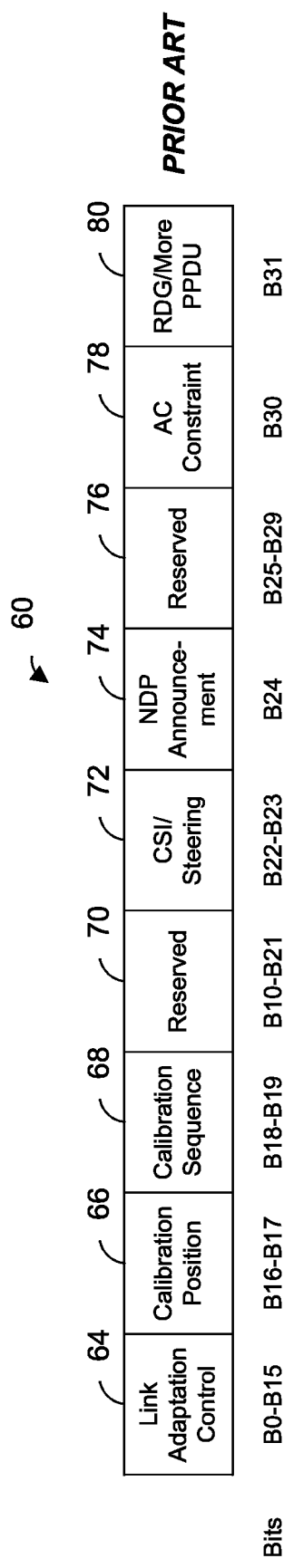
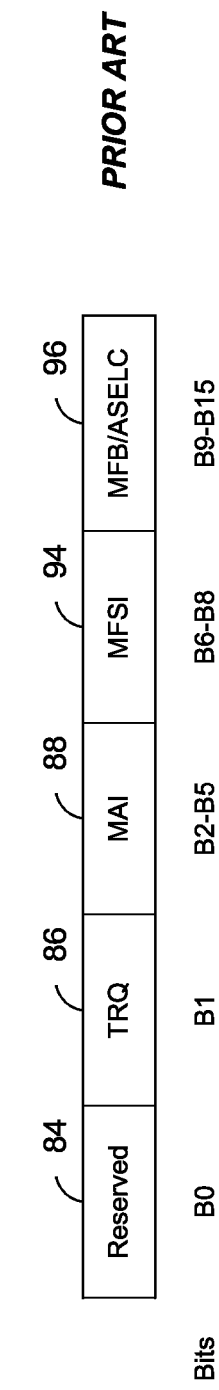
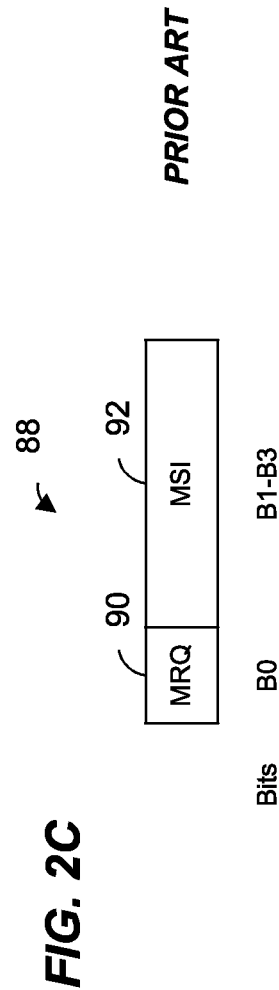
FIG. 2A
FIG. 2B
FIG. 2C

| HT/VHT | Unsolicited FB | MRQ | MSI | MFSI/GID-L | MFB | GID-H | Coding Type | FB Tx Type | Reserved | AC Constraint | RDG/More PPDU |
|---|---|---|---|---|---|---|---|---|---|---|---|
| 122 | 124 | 124 | 124 | 126/128 | 130 | 138 | 138 | 140/142 | 142 | 144/146 | 146/148 |

Bits: B0, B1, B2, B3-B5, B6-B8, B9-B23, B24-B26, B27, B28, B29, B30, B31

| Nsts | MCS | SNR |
|---|---|---|
| 132 | 134 | 136 |

Bits: B9-B11, B12-B15, B16-B23

FIG. 4A

| HT/VHT | Reserved | MRQ | MSI | MFSI/GID-L | MFB | GID-H | Coding Type | FB Tx Type | Unsolicited FB | AC Constraint | RDG/More PPDU |
|---|---|---|---|---|---|---|---|---|---|---|---|
| B0 | B1 | B2 | B3-B5 | B6-B8 | B9-B23 | B24-B26 | B27 | B28 | B29 | B30 | B31 |

Bits

| Nsts | MCS | SNR | BW |
|---|---|---|---|
| B9-B11 | B12-B15 | B16-B21 | B22-B23 |

Bits

↖132  ↖134  ↖216  ↖220

◄─ 212

LINK ADAPTATION IN A COMMUNICATION NETWORK

CROSS-REFERENCES TO RELATED APPLICATIONS

This disclosure claims the benefit of the following U.S. Provisional Patent Applications:

U.S. Provisional Patent Application No. 61/379,322, entitled "Link Adaptation in 802.11ac," filed on Sep. 1, 2010;

U.S. Provisional Patent Application No. 61/411,857, entitled "VHT Fast Link Adaptation," filed Nov. 9, 2010;

U.S. Provisional Patent Application No. 61/416,154, entitled "VHT Fast Link Adaptation," filed Nov. 22, 2010;

U.S. Provisional Patent Application No. 61/430,379, entitled "VHT Fast Link Adaptation," filed Jan. 6, 2011; and U.S. Provisional Patent Application No. 61/451,431, entitled "VHT Fast Link Adaptation," filed Mar. 10, 2011.

The disclosures of all of the above-referenced patent applications are hereby incorporated by reference herein in their entireties.

FIELD OF THE DISCLOSURE

The present disclosure relates generally to communication networks and, more particularly, to communication networks in which devices exchange information to adapt communication links due to changes in channel conditions, for example.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method for link adaptation in a network includes determining a link quality metric corresponding to a wireless communications link between a first communication device and a second communication device, and generating a communication frame having a header, wherein the header includes i) a first subfield of a control field to specify a modulation and coding scheme for use via the wireless communications link, and ii) a second subfield of the control field that includes the link quality metric. The method also includes causing the communication frame to be transmitted.

In another embodiment, an apparatus comprises a network interface configured to 1) determine a link quality metric corresponding to a wireless communications link between the network interface and another communication device, and 2) generate a communication frame having a header, wherein the header includes i) a first subfield of a control field to specify a modulation and coding scheme for use via the wireless communications link, and ii) a second subfield of the control field that includes the link quality metric. The network interface is further configured to cause the communication frame to be transmitted.

In yet another embodiment, a method for link adaptation in a network includes generating a control field to include a first subfield indicating a request for link quality information. The method additionally includes generating a communication frame having a header, wherein 1) the header includes the first subfield, and 2) the communication frame i) is not a sounding frame, and ii) is not a frame that announces a null data packet is to follow the communication frame. Also, the method includes causing the communication frame to be transmitted.

In still another embodiment, an apparatus comprises a network interface configured to 1) generate a control field to include a first subfield indicating a request for link quality information, and 2) generate a communication frame having a header, wherein the header includes the first subfield, and the communication frame i) is not a sounding frame, and ii) is not a frame that announces a null data packet is to follow the communication frame. The network interface is further configured to cause the communication frame to be transmitted.

BRIEF DESCRIPTION OF THE DRAWINGS

FIGS. 2A-2C are diagrams of a prior art control frame format.

FIGS. 3A-3B are diagrams of an example control frame format, according to an embodiment.

FIGS. 4A-4B are diagrams of another example control frame format, according to another embodiment.

DETAILED DESCRIPTION

In embodiments described below, a first network device, such as a client device in a wireless local area network (WLAN), transmits link quality information to a second network device, such as an access point (AP) of the WLAN. The link quality information is transmitted by the first network device in response to a request for the link quality information from the second network device, in some embodiments and/or scenarios. The link quality information transmitted by the first network device is unsolicited, i.e., transmitted at the initiative of the first network device and not in response to a request from the second network device, in some embodiments and/or scenarios. The link quality information is in the form of one or more of an indication of a modulation and coding set, signal-to-noise ratio (SNR) information, a received signal strength indicator (RSSI), a link margin, etc., in various embodiments.

Figure 1:
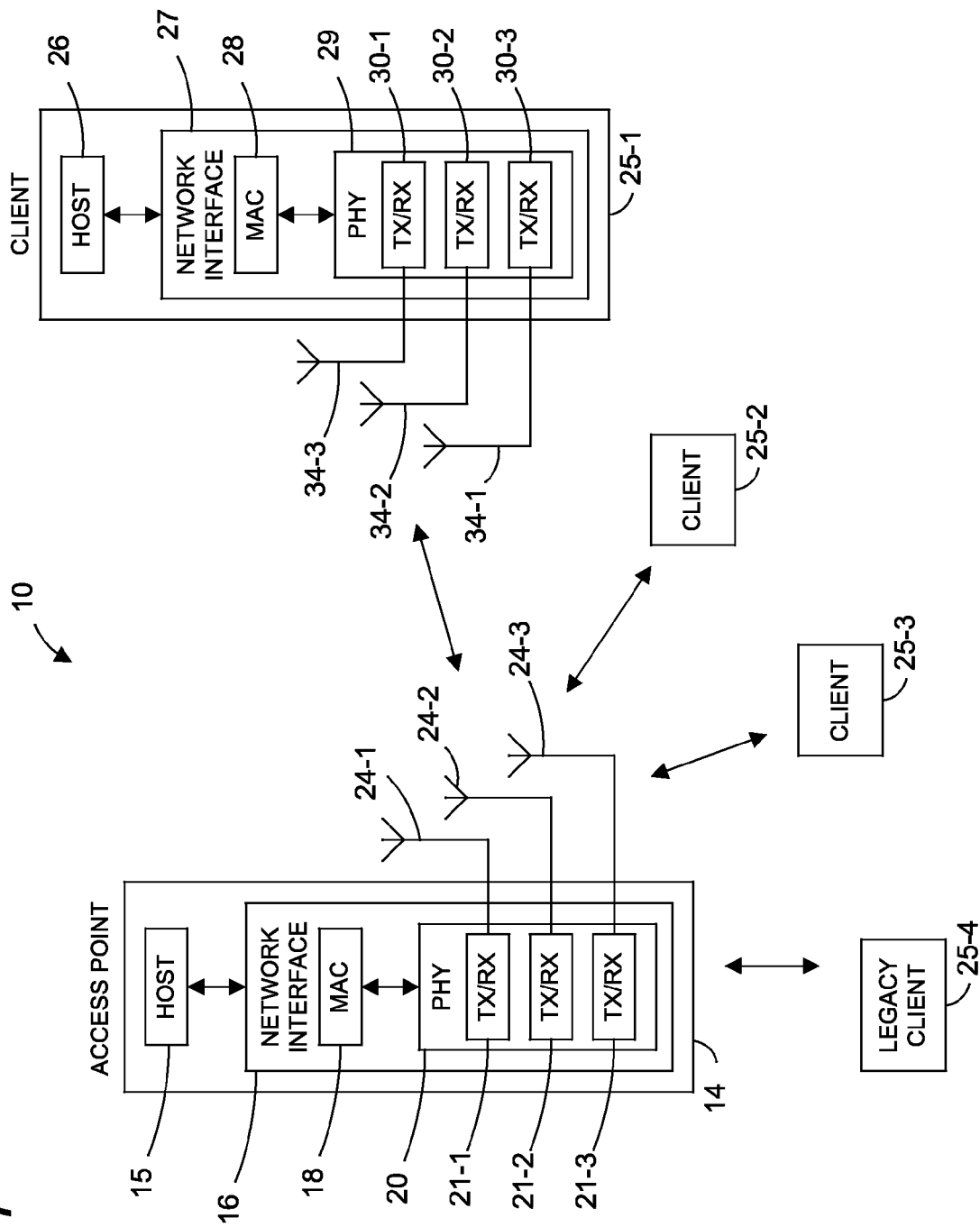
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., the IEEE 802.11ac Standard, now in the process of being standardized). In another embodiment, the MAC processing unit 18 and the PHY processing unit 20 are also configured to operate according to a second communication protocol (e.g., the IEEE 802.11n Standard).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to the second communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4, has a structure similar to the client station 25-1, but is not configured to operate according to the first communication protocol. Rather, in an embodiment, the client station 25-4 is configured to operate according to the second communication protocol. In various embodiments, the client stations 25 structured the same as or similar to the client station 25-1 have the same or a different number of transceivers and antennas. For example, the client station 25-2 has only two transceivers and two antennas, according to an embodiment.

According to an embodiment, the client station 25-4 is a legacy client station, i.e., the client station 25-4 is not enabled to receive and fully decode a communication frame that is transmitted by the AP 14 or another client station 25 according to the first communication protocol. Similarly, according to an embodiment, the legacy client station 25-4 is not enabled to transmit communication frames according to the first communication protocol. On the other hand, the legacy client station 25-4 is enabled to receive and fully decode and transmit communication frames according to the second communication protocol.

In various embodiments, the MAC processing unit 18 and the PHY processing unit 20 of the AP 14 are configured to generate communication frames conforming to the first communication protocol. The transceiver(s) 21 is/are configured to transmit the generated communication frames via the antenna(s) 24. Similarly, the transceiver(s) 24 is/are configured to receive the communication frames via the antenna(s) 24. The MAC processing unit 18 and the PHY processing unit 20 of the AP 14 are configured to process received communication frames conforming to the first communication protocol, according to various embodiments.

In various embodiments, the MAC processing unit 28 and the PHY processing unit 29 of the client device 25-1 are configured to generate communication frames conforming to the first communication protocol. The transceiver(s) 30 is/are configured to transmit the generated communication frames via the antenna(s) 34. Similarly, the transceiver(s) 30 is/are configured to receive communication frames via the antenna(s) 34. The MAC processing unit 28 and the PHY processing unit 29 of the client device 25-1 are configured to process received communication frames conforming to the first communication protocol, according to various embodiments.

FIG. 2A is a diagram of a prior art control field 60 that the AP 14 and/or the client stations 25-1, 25-2, 25-3 are configured to transmit to the legacy client station 25-4, and vice versa, for link adaptation purposes. The control field 60 is defined in the IEEE 802.11n Standard. The control field 60 is included in a MAC header of a communication frame. The control field 60 includes a link adaptation control subfield 64 that is utilized to request a modulation coding scheme (MCS) and to transmit an MCS. A calibration position subfield 66 is used to indicate a position in a calibration sounding exchange sequence, and a calibration sequence subfield 68 is used to indicate an instance of a calibration procedure. A subfield 70 is reserved. A channel state information (CSI)/steering subfield 72 is used to indicate a request for CSI or beamforming feedback. A null data packet (NDP) announcement subfield 74 is used to announce that an NDP sounding packet will follow the frame that includes the control field 60. A sounding packet is a communication frame having training fields that enable determining a channel estimate of a multiple input, multiple output (MIMO) communication channel, i.e., that has training fields that sound the available MIMO channel dimensions.

The control frame 60 also includes a reserved subfield 76. The control frame 60 also includes an access category (AC) constraint subfield 78 and a reverse direction grant (RDG)/ more PPDU subfield 80 related to a transmit opportunity (TXOP) holder permitting another station to transmit data during the TXOP.

FIG. 2B is a diagram of the link adaptation control subfield 64 of FIG. 2A. The link adaptation control subfield 64 includes a reserved subfield 84, and a training request (TRQ) subfield 86. The TRQ subfield 86 indicates whether a responder to the control field 60 is requested to transmit a sounding frame. An MCS request or antenna selection (ASEL) indication (MAI) subfield 88 indicates whether the control subfield 64 should be interpreted as relating to MCS feedback or relating to ASEL. When the MAI subfield 88 is set to the value 14, this indicates that the control subfield 64 is to be interpreted as related to ASEL. When the MAI subfield 88 is set to a value other than 14, this indicates that the control subfield 64 is to be interpreted as illustrated in FIG. 2C. Referring to FIG. 2C, when the MAI subfield 88 is set to a value other than 14, the MAI subfield 88 is interpreted to include an MCS request (MRQ) subfield 90 and an MRQ sequence identifier (MSI) subfield 92. The MRQ subfield 90 is set to one to request the responder to transmit MCS feedback (MFB) in response to the receiving the control field 60. When the MRQ subfield 90 is set to zero, MFB is not requested. When the MRQ subfield 90 is set to one, the MSI subfield 92 is set to a sequence number in the range 0 to 6 that identifies a specific MRQ. When the MRQ subfield 90 is set to zero, the MSI subfield 92 is reserved.

Referring again to FIG. 2B, the link adaptation control subfield 64 includes an MCS feedback sequence identifier (MFSI) subfield 94 to indicate an MSI to which MFB in the link adaptation subfield 64 corresponds. For example, a requester may send a request for MCS to a responder using the control frame 60 (FIGS. 2A-2C), and setting an MSI value in the MSI subfield 92. A responder to the request sends MCS feedback (MFB) using the control frame 60, and sets the MFSI subfield 94 to the MSI value set by the requester.

The link adaptation control subfield 64 also includes an MCS feedback and antenna selection command/data (MFB/ASELC) subfield 96. When the MAI subfield 88 is set to the value 14, the MFB/ASELC subfield 96 is interpreted as including ASEL data. On the other hand, when the MAI subfield 88 is set to a value other than 14, the MFB/ASELC subfield 96 is interpreted as indicating a recommended MCS. A value of 127 indicates that no MCS feedback (MFB) is provided.

According to the IEEE 802.11n Standard, a network device transmits a frame with the MRQ subfield 90 set to one only when i) the frame is a sounding PHY protocol data unit (PPDU), or ii) in a frame that announces an NDP will follow (i.e., sets the NDP announcement subfield 74 to one) and that is then followed by an NDP sounding packet.

In an embodiment, the AP 14 and/or the client stations 25-1, 25-2, 25-3 utilize the control field 60 when performing link adaptation with the legacy client station 25-4, and the legacy client station 25-4 utilizes the control field 60 when performing link adaptation with the AP 14 and/or one of the client stations 25-1, 25-2, 25-3.

FIG. 3A is a diagram of an example control field 120 that the AP 14 is configured to transmit to one of the client stations 25-1, 25-2, 25-3, and vice versa, for link adaptation purposes, according to an embodiment. The control field 120 includes a subfield 124 to indicate whether the control field 120 should be interpreted according to the format illustrated in FIG. 3A or the format illustrated in FIG. 2A. For example, if the subfield 124 is set to a first value (e.g., zero), the control field is interpreted according to the format illustrated in FIG. 2A. On the other hand, if the subfield 124 is set to a second value (e.g., one), the control field is interpreted according to the format illustrated in FIG. 3A.

A subfield 122 is utilized to indicate whether the control field 120 includes unsolicited link adaptation feedback, i.e., not sent in response to an MRQ. An MRQ subfield 124 is set to one to request the responder to transmit MCS feedback (MFB) in response to the receiving the control field 120. When the MRQ subfield 120 is set to zero, MFB is not requested. When the MRQ subfield 124 is set to one, an MSI subfield 126 is set to a sequence number from a range 0-6 that identifies a specific MRQ. When the MRQ subfield 124 is set to zero, the MSI subfield 126 is reserved.

An MCS feedback sequence identifier (MFSI)/GID-L subfield 128 indicates an MSI to which the MFB in the control field 120 corresponds. For example, a requester may send a request for MCS to a responder using the control frame 120, and setting an MSI value in the MSI subfield 126. A responder to the request, sends MCS feedback (MFB) using the control frame 120, and sets the MFSI/GID-L field 128 to the MSI value set by the requester. When the subfield 122 is set to indicate the control field 120 includes unsolicited link adaptation feedback, the field MFSI/GID-L represents the 3 lowest bits of the Group ID in the referred frame, based on which the unsolicited MFB is computed, in an embodiment.

An MFB subfield 130 is utilized for transmitting MFB information and/or other information related to link quality. FIG. 3B is a diagram of the MFB subfield 130, according to an embodiment. The MFB subfield 130 includes a subfield 132 to indicate a number of space-time streams to which the MFB information, and/or other information related to link quality, corresponds. An MCS subfield 134 is utilized to provide an indication of a suggested modulation and coding scheme (MCS) for use in transmitting via the link. In an embodiment, a predefined value (e.g., 15 or another suitable value), indicates that MCS feedback is not available. A subfield 136 is utilized to provide information related to link quality other than a suggested MCS and a suggested number of space-time streams. In an embodiment, the subfield 136 is utilized to provide signal to noise ratio (SNR) information related to the link. In an embodiment, the SNR information includes a value indicating an average SNR (e.g., in decibels) averaged over a plurality of orthogonal frequency division multiplexing (OFDM) tones or sub-channels (e.g., all tones, all data tones, etc.) and across all spatial streams, as measured by the responder. In one embodiment, the SNR information is determined according to:

$$\text{SNR\_avg} = \frac{1}{N_{STS}N_{Data}^{Tone}} \sum_{k=-N_{SR}}^{N_{SR}} \sum_{i_{STS}=1}^{N_{STS}} SNR_{i_{STS},k}, \text{ and} \quad \text{(Equation 1)}$$

$$\text{SNR\_FB} = \text{Quantized}[4(\text{SNR\_avg} - 22)] \quad \text{(Equation 2)}$$

where $N_{STS}$ is the number of spatial streams, $N_{Data}^{Tone}$ is the number of data tones, k is a tone index, $N_{SR}$ is a maximum tone index value, $N_{SR}$ is a minimum tone index value, $i_{STS}$ is a spatial stream index, and $SNR_{i_{STS},k}$ is an SNR value for the k-th tone of an $i_{STS}$-th spatial stream. In Equation 2, the value inside the brackets is quantized to an 8-bit (or to another suitable number of bits), twos-complement number (or another suitable format).

In another embodiment, the SNR information includes a single SNR value which is the smallest tone-averaged SNR value among all spatial streams. In another embodiment, the SNR information includes i) a value indicating an average SNR averaged over a plurality of OFDM tones (e.g., all tones, all data tones, etc.) and across all spatial streams, as measured by the responder, and ii) a single SNR value which is the smallest tone-averaged SNR value among all spatial streams. In another embodiment, the SNR information includes a link margin value, i.e., a difference between measured SNR and a sensitivity point of the MCS indicated by the MCS subfield 134.

In another embodiment, the subfield 136 includes a received signal strength indicator (RSSI).

A GID-H subfield 138 is valid when the subfield 122 is set to indicate the control field 120 includes unsolicited link adaptation feedback, and the field 138 represents the 3 highest bits of the Group ID in the referred frame, based on which the unsolicited MFB is computed, in an embodiment. A coding type subfield 140 is valid when the subfield 122 is set to indicate the control field 120 includes unsolicited link adaptation feedback, and it represents the error control coding type (BCC or LDPC) in the referred frame, based on which the unsolicited MFB is computed. A feedback Tx type subfield 142 is valid when the subfield 122 is set to indicate the control field 120 includes unsolicited link adaptation feedback, and it represents whether transmit beamforming is applied in the referred frame, based on which the unsolicited MFB is computed.

The control field 120 includes a reserved subfield 144. The control frame 120 also includes an access category (AC) constraint subfield 146 and a reverse direction grant (RDG)/more PPDU subfield 148 related to a transmit opportunity (TXOP) holder permitting another station to transmit data during the TXOP.

Figure 5:
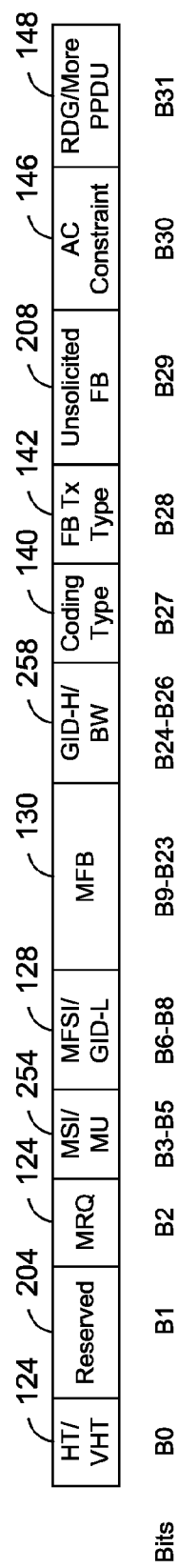
FIG. 5 is a diagram of another example control frame format, according to another embodiment.

Suitable orderings and numbers of bits of the subfields other than the examples in FIGS. 3A and 3B are used in other embodiments. For example, FIGS. 4A, 4B and FIG. 5 illustrate other example orderings and numbers of bits.

FIG. 4A is a diagram of another example control field 200 that the AP 14 is configured to transmit to one of the client stations 25-1, 25-2, 25-3, and vice versa, for link adaptation purposes, according to an embodiment. Similar to the example control field 120 of FIG. 3A, the control field 200 includes the subfield 124 to indicate whether the control field 200 should be interpreted according to the format illustrated in FIG. 4A or the format illustrated in FIG. 2A. For example, if the subfield 124 is set to a first value (e.g., zero), the control field is interpreted according to the format illustrated in FIG. 2A. On the other hand, if the subfield 124 is set to a second value (e.g., one), the control field is interpreted according to the format illustrated in FIG. 4A.

The control field 200 is similar to the control field 120 of FIG. 3A, and like-numbered elements are not discussed further. Compared to the control field 120 of FIG. 3A, a reserved subfield 204 and an unsolicited FB subfield 208 are in different locations in the control field. Additionally, an MFB subfield 212 has a different format as compared to the MFB subfield 130 of FIG. 3B.

A subfield 216 is similar to the subfield 136 of FIG. 3B, but has two less bits. The subfield 212 also includes a bandwidth (BW) subfield 220 to indicate a bandwidth of the received communication frame used for the MCS selection and/or the link quality determination and corresponding to the values in the fields 134 and/or 216. The BW subfield 220 is utilized for unsolicited feedback (i.e., when the unsolicited feedback subfield 208 is set to indicate unsolicited feedback) when it may not be clear to the recipient of the control field 200 the bandwidth of the communication frame used for the MCS selection and/or the link quality determination and corresponding to the values in the fields 134 and/or 216. In an embodiment, the BW subfield 220 is reserved when the unsolicited feedback subfield 208 is not set to indicate unsolicited feedback.

FIG. 5 is a diagram of another example control field 250 that the AP 14 is configured to transmit to one of the client stations 25-1, 25-2, 25-3, and vice versa, for link adaptation purposes, according to an embodiment. Similar to the example control fields 120 of FIGS. 3A and 200 of FIG. 4A, the control field 200 includes the subfield 124 to indicate whether the control field 200 should be interpreted according to the format illustrated in FIG. 5 or the format illustrated in FIG. 2A. For example, if the subfield 124 is set to a first value (e.g., zero), the control field is interpreted according to the format illustrated in FIG. 2A. On the other hand, if the subfield 124 is set to a second value (e.g., one), the control field is interpreted according to the format illustrated in FIG. 5.

The control field 250 is similar to the control field 200 of FIG. 4A (and to the control field 120 of FIG. 3A), and like-numbered elements are not discussed further. As in the control field 200 of FIG. 4A, the reserved subfield 204 and the unsolicited FB subfield 208 are in different locations in the control field as compared to the control field 120 of FIG. 3A. The MFB subfield 130 has the same format as the MFB subfield 130 of FIG. 3B, in an embodiment.

When the unsolicited FB subfield 208 is set to a value that does not indicate unsolicited feedback and when the MRQ subfield 124 is set to one, an MSI/multi-user (MU) indicator subfield 254 is set to a sequence number from the range 0-6, as an example, that identifies a specific MRQ. When the unsolicited FB subfield 208 is set to a value indicating unsolicited feedback, a bit of the subfield 254 is reinterpreted to indicate whether the feedback in the subfield 130 is associated with a single user transmission or a multi-user transmission, in an embodiment. In another embodiment, when the unsolicited FB subfield 208 is set to a value indicating unsolicited feedback, the MRQ subfield 124 is reinterpreted to include a bit set to indicate whether the feedback is associated with a single user transmission or a multi-user transmission.

When the unsolicited FB subfield 208 is set to a value indicating unsolicited feedback and the subfield 254 indicates that the feedback in the subfield 130 is associated with a single user transmission, two bits of the subfield 258 are reinterpreted to indicate a bandwidth of the communication frame used for the MCS selection and/or the link quality determination and corresponding to the values in the subfield 130, and a third bit of the subfield 258 is reinterpreted to be reserved, in an embodiment. When the unsolicited FB subfield 208 is set to a value indicating unsolicited feedback but the subfield 254 indicates that the feedback in the subfield 130 is associated with a multi user transmission, a recipient of the control field 250 can determine the bandwidth of the communication frame used for the MCS selection and/or the link quality determination and corresponding to the values in the subfield 130 based on a group identifier in the subfield 258 that indicates a group of stations to which the communication frame was transmitted. In another embodiment, when the unsolicited FB subfield 208 is set to a value indicating unsolicited feedback but the subfield 254 indicates that the feedback in the subfield 130 is associated with a multi user transmission, two bits of the subfield 258 are reinterpreted to indicate a bandwidth of the communication frame used for the MCS selection and/or the link quality determination and corresponding to the values in the subfield 130, and a third bit of the subfield 258 is reinterpreted to be reserved. In another embodiment, when the unsolicited FB subfield 208 is set to a value indicating unsolicited feedback and the subfield 124 indicates that the feedback in the subfield 130 is associated with a single user transmission, two bits of the subfield 258 are reinterpreted to indicate a bandwidth of the communication frame used for the MCS selection and/or the link quality determination and corresponding to the values in the subfield 130.

Figure 6:
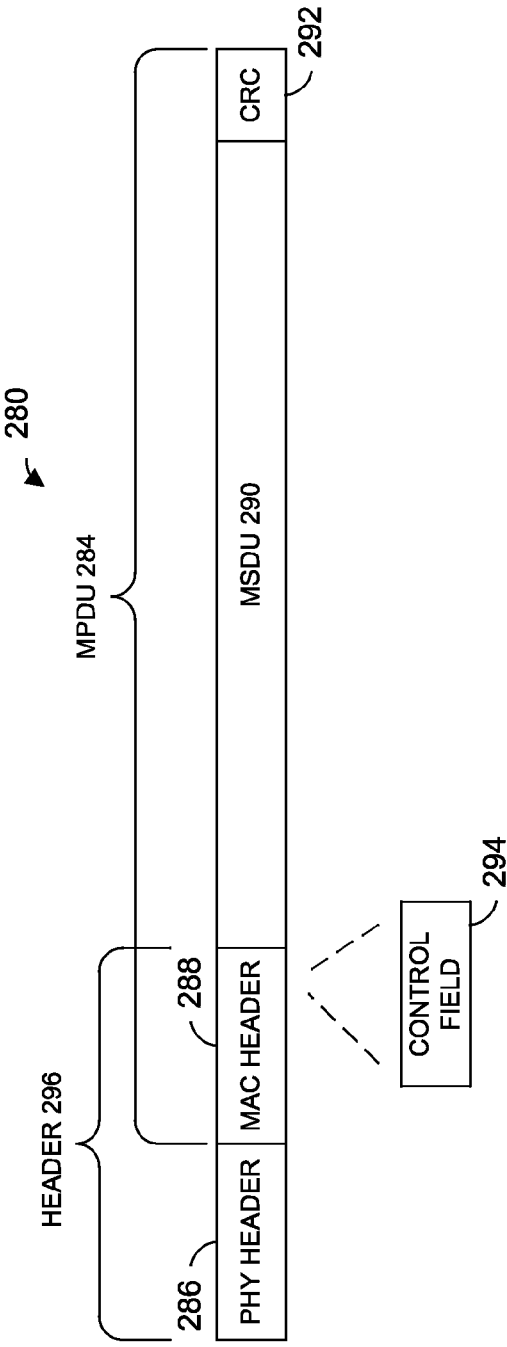
FIG. 6 is a diagram of an example communication frame that includes a control frame, according to an embodiment.

FIG. 6 is a diagram of an example communication frame 280 that is utilized to convey a control frame such as discussed above with respect to FIGS. 3A-C, 4A, 4B and 5, in some embodiments. The frame 280 includes a MAC protocol data unit (MPDU) 284 and a PHY header 286. The MPDU 284 includes a MAC header 288, a MAC service data unit (MSDU) 290, and a cyclic redundancy check (CRC) field 292. A control field 294 is included in the MAC header 288. In another embodiment, the control field 294 is included in the PHY header 286. In an embodiment, the control frame 294 has a format as in FIG. 3A. In another embodiment, the control frame 294 has a format as in FIG. 3B. In another embodiment, the control frame 294 has a format as in FIG. 5. In other embodiments, the control frame 294 has another suitable format. The PHY header 286 and the MAC header 288 are included in a header portion 296 of the communication frame. Thus, the control field 294 is included in the header portion 296.

Figure 7:
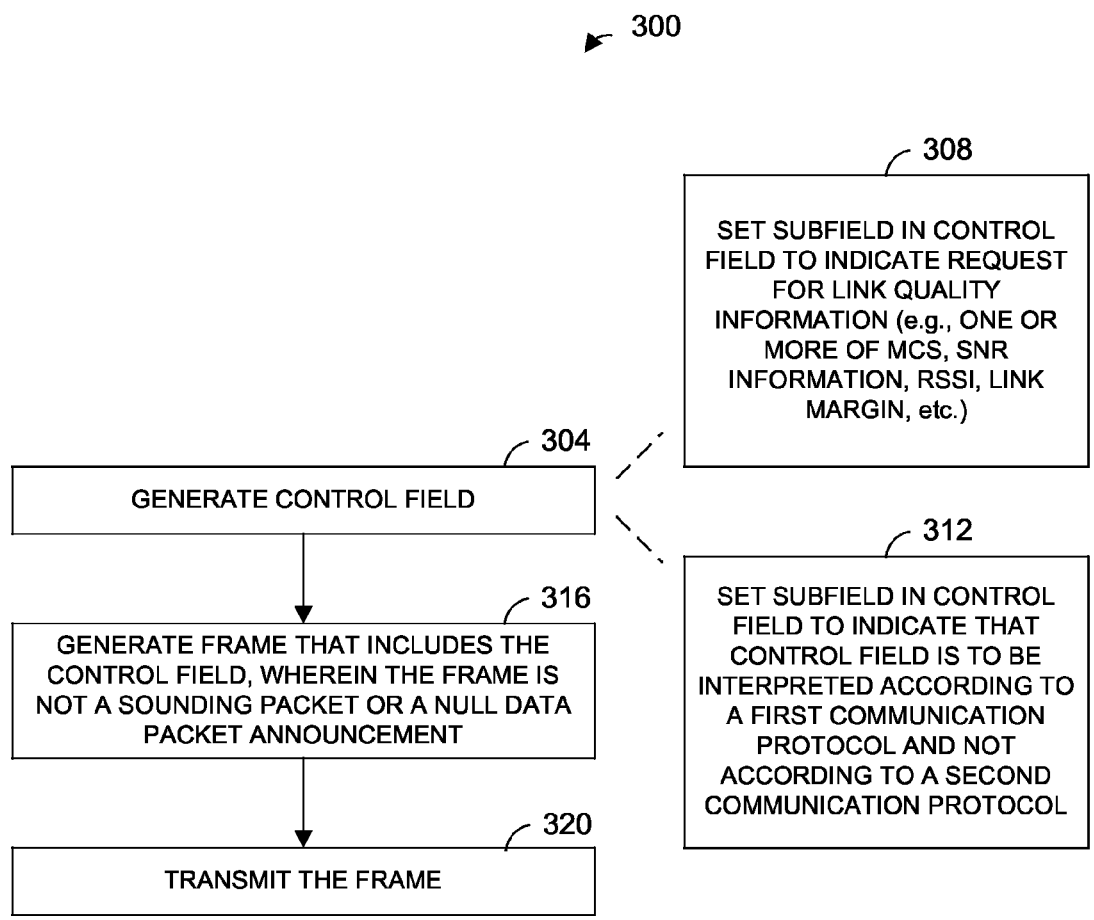
FIG. 7 is a flow diagram of an example method for requesting information to perform link adaptation, according to an embodiment.

FIG. 7 is a flow diagram of an example method 300 for requesting information to perform link adaptation, in an embodiment. The method 300 is implemented by the network interface 16 (e.g., the MAC processing unit 18 and/or the PHY processing unit 20) (FIG. 1), in an embodiment. The method 300 is implemented by the network interface 27 (e.g., the MAC processing unit 28 and/or the PHY processing unit 29) (FIG. 1), in another embodiment. In other embodiments, the method 300 is implemented by other suitable network interfaces.

At block 304, a control field for inclusion in a communication frame is generated. In an embodiment, the control field is a field of a MAC header and is to be included in the MAC header of the communication frame. In an embodiment, the control frame has a format as in FIG. 3A. In another embodiment, the control frame has a format as in FIG. 4A. In another embodiment, the control frame has a format as in FIG. 5. In other embodiments, the control frame has another suitable format.

In an embodiment, the block 304 includes a block 308 at which a subfield of the control field is set to indicate a request for link quality information. In an embodiment, the subfield indicates a request for one or more of an MCS, SNR information, an RSSI, link margin information, etc. In some embodiments, block 308 includes setting a value in the MRQ subfield 124 (FIG. 3A, 4A, or 5) to indicate the request. In some embodiments, block 304 includes setting the MSI subfield 126 (FIG. 3A or 4A), or setting the MSI/MU subfield 254 (FIG. 5) to a sequence number (e.g., from a range 0-6 or another suitable range) that identifies a specific request.

In an embodiment, the block 304 includes a block 312, at which a subfield is set to a value that indicates that the control field is to be interpreted according to a first communication protocol and is not to be interpreted according to a second communication protocol. In some embodiments, block 312 includes setting the subfield 124 to indicate that the control field is to be interpreted according to a first communication protocol and is not to be interpreted according to a second communication protocol.

In an embodiment, block 304 includes both block 308 and block 312. In an embodiment, block 304 includes block 308, but block 304 and the method 300 omit block 312.

At block 316, a communication frame is generated that includes the control field generated at block 304. In an embodiment, block 316 includes generating a MAC header of the communication frame that includes the control field generated at block 304.

At block 320, the communication frame generated at block 316 is transmitted, or caused to be transmitted, to another device in a communication system.

In an embodiment and in some scenarios, the communication frame generated at block 316 and transmitted at block 320 is not a sounding packet and is not a communication frame that includes an indication that a null data packet will be transmitted in a subsequent frame (e.g., a null data packet (NDP) announcement frame). In other embodiments and/or scenarios, the communication frame generated at block 316 and transmitted at block 320 is a sounding packet or an NDP announcement frame.

Figure 8:
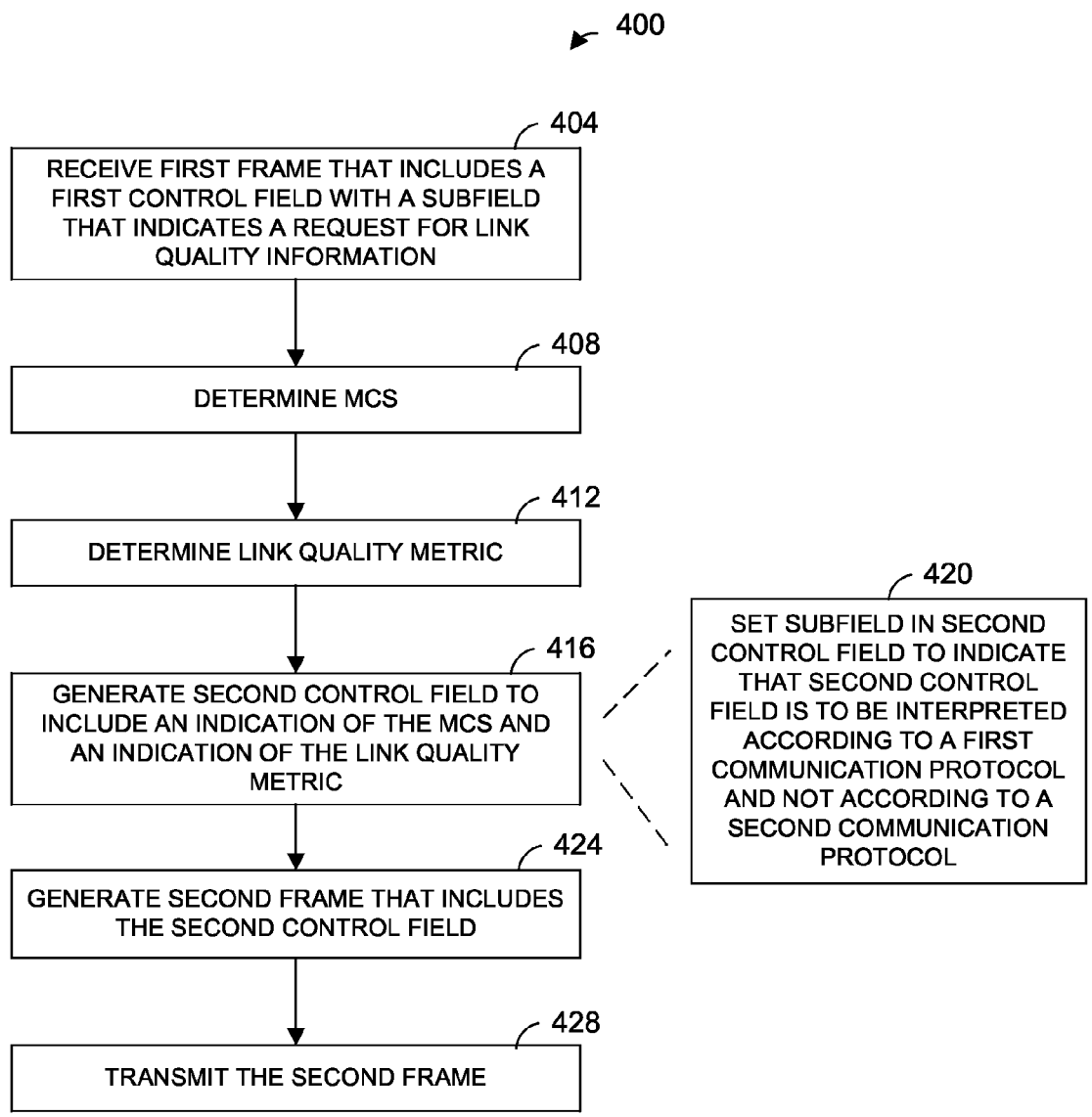
FIG. 8 is a flow diagram of an example method for generating and providing information for performing link adaptation, according to an embodiment.

FIG. 8 is a flow diagram of an example method 400 for generating and providing information for performing link adaptation, in an embodiment. The method 400 is implemented by the network interface 16 (e.g., the MAC processing unit 18 and/or the PHY processing unit 20) (FIG. 1), in an embodiment. The method 400 is implemented by the network interface 27 (e.g., the MAC processing unit 28 and/or the PHY processing unit 29) (FIG. 1), in another embodiment. In other embodiments, the method 400 is implemented by other suitable network interfaces.

At block 404, a first communication frame having a first control field is received. In an embodiment, the first control field is included in a field of a MAC header of the first communication frame. The first control field includes a subfield that includes an indication of a request for link quality information. In an embodiment, the first control frame has a format as in FIG. 3A. In another embodiment, the first control frame has a format as in FIG. 4A. In another embodiment, the first control frame has a format as in FIG. 5. In other embodiments, the first control frame has another suitable format. In some embodiments, the subfield is the MRQ subfield 124 (FIG. 3A, 4A, or 5) set to indicate a request for link quality information. In some embodiments, the MSI subfield 126 (FIG. 3A or 4A) or the MSI/MU subfield 254 (FIG. 5) is set to a sequence number (e.g., from a range 0-6 or another suitable range) that identifies a specific MRQ request.

At block 408, a suggested MCS is determined based on the first communication frame received at block 404. A suitable technique for determining a suggested MCS, such as techniques known to those of ordinary skill in the art, is utilized.

At block 412, a link quality metric is determined based on the first communication frame received at block 404. A suitable technique for determining a link quality metric, such as techniques known to those of ordinary skill in the art, is utilized. In an embodiment, the link quality metric is a signal to noise ratio (SNR) metric related to the first communication frame received at block 404. In an embodiment, the SNR metric corresponds to a value indicating an average SNR (e.g., in decibels) averaged over a plurality of OFDM tones (e.g., all tones, all data tones, etc.) and across all spatial streams, related to the first communication frame received at block 404 and as measured by the network interface implementing the method 400. In one embodiment, the SNR metric is determined according to Equation 1. In another embodiment, the metric is a single SNR value which is the smallest tone-averaged SNR value among all spatial streams related to the first communication frame received at block 404. In another embodiment, the SNR metric includes i) a value indicating an average SNR averaged over a plurality of OFDM tones (e.g., all tones, all data tones, etc.) and across all spatial streams, related to the first communication frame received at block 404, and ii) a single SNR value which is the smallest tone-averaged SNR value among all spatial streams related to the first communication frame received at block 404. In another embodiment, the link quality metric includes a link margin value related to the first communication frame received at block 404, i.e., a difference between measured SNR and a sensitivity point of the MCS indicated by the MCS subfield 134. In another embodiment, the link quality indicator includes a received signal strength indicator (RSSI) related to the first communication frame received at block 404.

At block 416, a second control field for inclusion in a second communication frame is generated to include an indication of the MCS determined at block 408 and an indication of the link quality metric determined at block 412. In an embodiment, the second control field is a field of a MAC header and is to be included in the MAC header of the second communication frame. In an embodiment, the second control frame has a format as in FIG. 3A. In another embodiment, the second control frame has a format as in FIG. 3B. In another embodiment, the second control frame has a format as in FIG. 5. In other embodiments, the second control frame has another suitable format. In an embodiment, the indication of the MCS is included in the subfield 134. In an embodiment, the indication of the link quality metric is included in the subfield 136 (FIG. 3A). In another embodiment, the indication of the link quality metric is included in the subfield 216 (FIG. 4A). In an embodiment, the indication of the link quality metric is determined according to Equation 2.

In an embodiment, block 416 includes setting the MFSI subfield 128 (FIG. 3A, 4A, or 5) to a sequence number included in the MSI or MSI/MU subfield of the first control field (block 404). In an embodiment, the block 416 includes setting the subfield 122 (FIG. 3A) or the subfield 208 (FIG. 4A, or 5) to a value indicating that the link quality information included in the second control field is in response to a request for link quality information (e.g., in response to the first control field in the first communication frame (block 404)).

In an embodiment, block 416 includes a block 420, at which a subfield of the second control field is set to a value that indicates that the second control field is to be interpreted according to a first communication protocol and is not to be interpreted according to a second communication protocol. In some embodiments, block 420 includes setting the subfield 124 to indicate that the second control field is to be interpreted according to a first communication protocol and is not to be interpreted according to a second communication protocol. In an embodiment, block 416 and the method 400 omit block 420.

At block 424, the second communication frame is generated to include the second control field generated at block 416. In an embodiment, block 424 includes generating a MAC header of the second communication frame that includes the second control field generated at block 416.

At block 428, the second communication frame generated at block 424 is transmitted, or caused to be transmitted, to the device that generated the first communication frame (block 404).

In an embodiment and in some scenarios, the communication frame received at block 404 is not a sounding packet and is not a communication frame that includes an indication that a null data packet will be transmitted in a subsequent frame. In other embodiments and/or scenarios, the communication frame received at block 404 is a sounding packet.

In some embodiments, block 408 is omitted. In some embodiments when block 408 is omitted, block 416 includes setting a subfield in the second control field to a value to indicate that MCS feedback is not available. In an embodiment, the subfield 134 is set to a value to indicate that MCS feedback is not available. In some embodiments when block 408 is omitted, block 416 omits setting a subfield in the second control field to indicate a suggested MCS.

Figure 9:
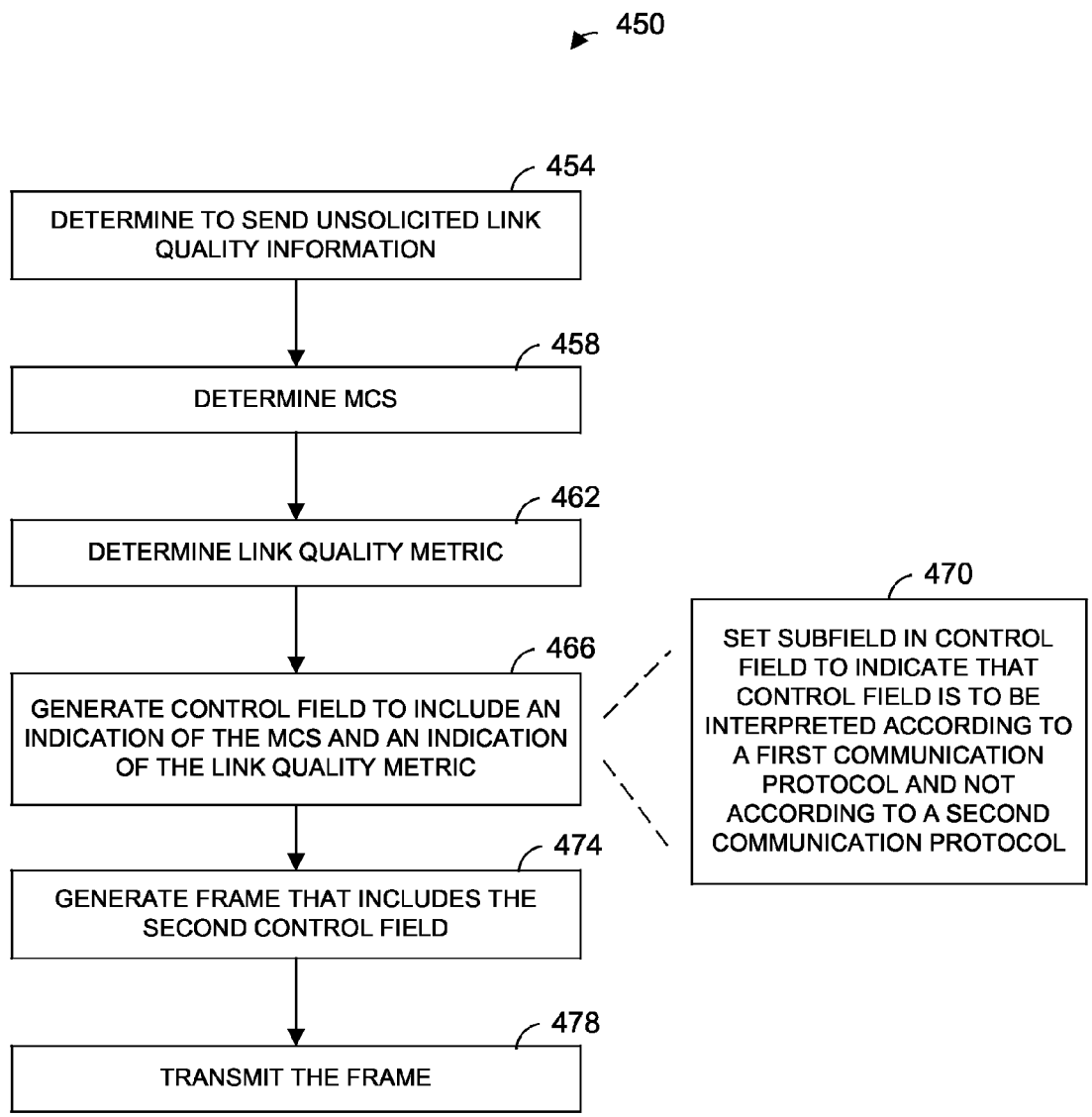
FIG. 9 is a flow diagram of an example method for generating and providing unsolicited information for performing link adaptation, in an embodiment.

FIG. 9 is a flow diagram of an example method 450 for generating and providing unsolicited information for performing link adaptation, in an embodiment. The method 450 is implemented by the network interface 16 (e.g., the MAC processing unit 18 and/or the PHY processing unit 20) (FIG. 1), in an embodiment. The method 450 is implemented by the network interface 27 (e.g., the MAC processing unit 28 and/or the PHY processing unit 29) (FIG. 1), in another embodiment. In other embodiments, the method 450 is implemented by other suitable network interfaces.

At block 454, it is determined to send unsolicited link quality information to another communication device. Determining whether to send unsolicited link quality information to another communication device is performed in a suitable manner, including using techniques known to those of ordinary skill in the art. For example, in an embodiment, determining to send unsolicited link quality information to another communication device is based on detecting a change in link quality (e.g., increased or decreased SNR, RSSI, PER, etc.).

At block 458, a suggested MCS is determined based on a recently received communication frame from the other communication device. A suitable technique for determining a suggested MCS, such as techniques known to those of ordinary skill in the art, is utilized.

At block 462, a link quality metric is determined based on based on a recently received communication frame from the other communication device. The recently received communication frame utilized at block 462 is the same as the communication frame utilized at block 458, in an embodiment. In another embodiment, the recently received communication frame utilized at block 462 is different than the communication frame utilized at block 458.

A suitable technique for determining a link quality metric, such as techniques known to those of ordinary skill in the art, is utilized. In an embodiment, the link quality metric is a signal to noise ratio (SNR) metric related to the recently received communication frame. In an embodiment, the SNR metric corresponds to a value indicating an average SNR (e.g., in decibels) averaged over a plurality of OFDM tones (e.g., all tones, all data tones, etc.) and across all spatial streams, related to the recently received communication frame and as measured by the network interface implementing the method 450. In one embodiment, the SNR metric is determined according to Equation 1. In another embodiment, the metric is a single SNR value which is the smallest tone-averaged SNR value among all spatial streams related to the recently received communication frame. In another embodiment, the SNR metric includes i) a value indicating an average SNR averaged over a plurality of OFDM tones (e.g., all tones, all data tones, etc.) and across all spatial streams, related to the recently received communication frame, and ii) a single SNR value which is the smallest tone-averaged SNR value among all spatial streams related to the recently received communication frame. In another embodiment, the link quality metric includes a link margin value related to the recently received communication frame, i.e., a difference between measured SNR and a sensitivity point of the MCS indicated by the MCS subfield 134. In another embodiment, the link quality indicator includes a received signal strength indicator (RSSI) related to the recently received communication frame.

At block 466, a control field for inclusion in a communication frame is generated to include an indication of the MCS determined at block 458 and an indication of the link quality metric determined at block 462. In an embodiment, the control field is a field of a MAC header and is to be included in the MAC header of the communication frame. In an embodiment, the control frame has a format as in FIG. 3A. In another embodiment, the control frame has a format as in FIG. 3B. In another embodiment, the control frame has a format as in FIG. 5. In other embodiments, the control frame has another suitable format. In an embodiment, the indication of the MCS is included in the subfield 134. In an embodiment, the indication of the link quality metric is included in the subfield 136 (FIG. 3A). In another embodiment, the indication of the link quality metric is included in the subfield 216 (FIG. 4A). In an embodiment, the indication of the link quality metric is determined according to Equation 2.

In an embodiment, block 466 includes setting the subfield 122 (FIG. 3A) or the subfield 208 (FIG. 4A, or 5) to a value indicating that the link quality information included in the control field is unsolicited. In an embodiment, when the MCS determined at block 458 and/or the link quality metric determined at block 462 is based on a received single user frame, block 466 includes setting a subfield (e.g., subfield 220 of FIG. 4B or subfield 258 of FIG. 5) in the control field to indicate the bandwidth of the received single user frame on which the MCS determined at block 458 and/or the link quality metric determined at block 462 are based. In an embodiment, when the MCS determined at block 458 and/or the link quality metric determined at block 462 is based on a received multi user frame, block 466 includes setting a subfield (e.g., subfields 128, 138, 258) in the control field to indicate a group ID of the received multi user frame on which the MCS determined at block 458 and/or the link quality metric determined at block 462 are based.

In an embodiment, block 466 includes a block 470, at which a subfield of the control field is set to a value that indicates that the control field is to be interpreted according to a first communication protocol and is not to be interpreted according to a second communication protocol. In some embodiments, block 470 includes setting the subfield 124 to indicate that the control field is to be interpreted according to a first communication protocol and is not to be interpreted according to a second communication protocol. In an embodiment, block 466 and the method 450 omit block 470.

At block 474, the communication frame is generated to include the control field generated at block 466. In an embodiment, block 474 includes generating a MAC header of the communication frame that includes the control field generated at block 466.

At block 478, the communication frame generated at block 474 is transmitted, or caused to be transmitted, to the device that generated the communication frame utilize to generate the MCS and/or the link quality information.

In some embodiments, block 462 is omitted. In some embodiments when block 462 is omitted, block 466 omits setting a subfield in the control field to indicate a link quality metric.

Referring to FIGS. 8 and 9, in some embodiments and/or scenarios, a network interface of a communication device that receives the communication frame transmitted at block 428 or block 479 utilizes the MCS indicated in the control field (if included). In some embodiments and/or scenarios, a network interface of a communication device that receives the communication frame transmitted at block 428 or block 479 utilizes the link quality metric indicated in the control field (if included) to determine an MCS to be used when transmitting to the communication device implementing the method 400/450.

Figure 10:
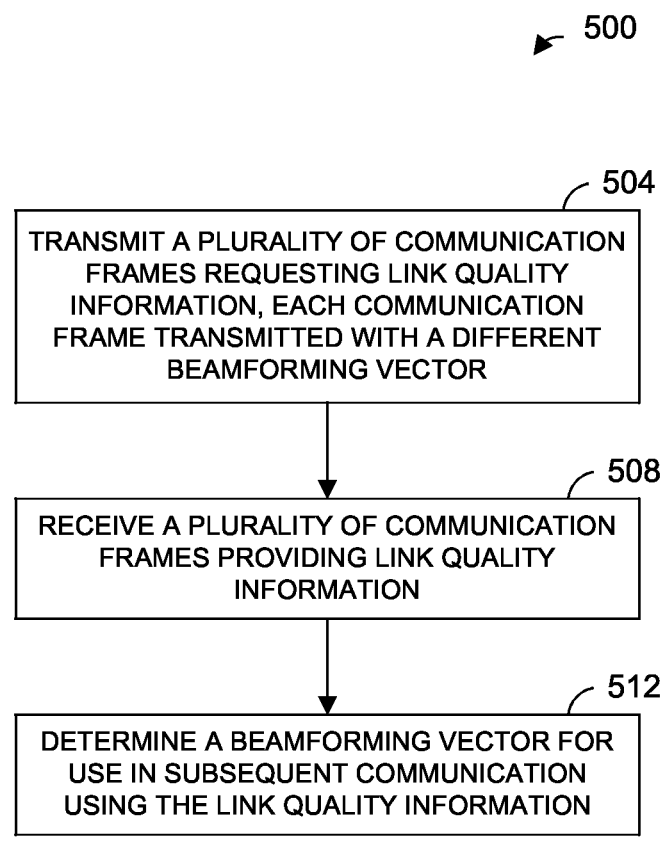
FIG. 10 is a flow diagram of an example method for determining a beamforming vector using link quality information, in an embodiment.

FIG. 10 is a flow diagram of an example method 500 for determining a beamforming vector using link quality information, in an embodiment. The method 500 is implemented by the network interface 16 (e.g., the MAC processing unit 18 and/or the PHY processing unit 20) (FIG. 1), in an embodiment. The method 500 is implemented by the network interface 27 (e.g., the MAC processing unit 28 and/or the PHY processing unit 29) (FIG. 1), in another embodiment. In other embodiments, the method 500 is implemented by other suitable network interfaces.

At block 504, a plurality of communication frames that each request link quality information are generated and transmitted to another communication device. Each of the communication frames are transmitted using a different beamforming vector, in an embodiment. Each of the communication frames are generated using a method such as described with respect to FIG. 7, in an embodiment. In an embodiment, the plurality of communication frames transmitted at block 504 are transmitted using a same MCS.

At block 508, a plurality of communication frames that each include link quality information are received from the other communication device in response to the plurality of communication frames transmitted at block 504. Each of the other communication frames received at block 508 are generated by the other communication device using a method such as described with respect to FIG. 8, in an embodiment.

At block 512, a beamforming vector for use in subsequent transmissions to the other communication device is determined based on the link quality information received at block 508. For example, a beamforming vector that provides a highest SNR value is selected, in an embodiment. As another example, a beamforming vector that provides a highest link margin is selected, in an embodiment. As another example, a beamforming vector that provides a highest RSSI is selected, in an embodiment. As another example, a set of beamforming vectors that provide with the highest SNR values, link margins, RSSIs, etc., are utilized to generate a beamforming vector, in an embodiment. The beamforming vector determined at block 512 is utilized to transmit subsequent communication frames to the other communication device.

Figure 11:
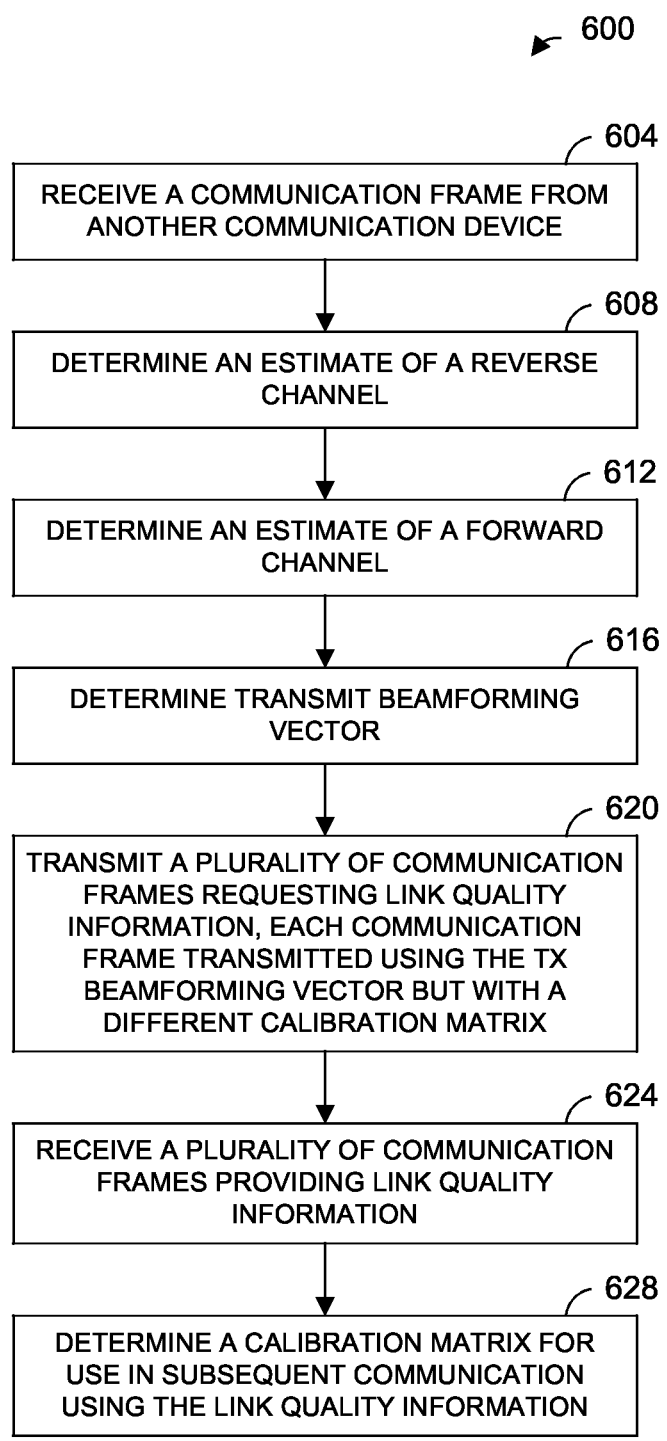
FIG. 11 is a flow diagram of an example method for determining a calibration matrix using link quality information, in an embodiment.

FIG. 11 is a flow diagram of an example method 600 for determining a calibration matrix for use in implicit beamforming using link quality information, in an embodiment. The method 600 is implemented by the network interface 16 (e.g., the MAC processing unit 18 and/or the PHY processing unit 20) (FIG. 1), in an embodiment. The method 600 is implemented by the network interface 27 (e.g., the MAC processing unit 28 and/or the PHY processing unit 29) (FIG.

1), in another embodiment. In other embodiments, the method 600 is implemented by other suitable network interfaces.

At block 604, a communication frame is received at first communication device from a second communication device. The communication frame received at block 604 is a communication frame having training signals to sound a reverse MIMO channel. At block 608, an estimate of a channel from the second communication device to the first communication device, i.e., a reverse channel estimate, is determined based on the communication frame received at block 604.

At block 612, a forward channel estimate, i.e., an estimate of the channel from the first communication device to the second communication device, is determined based on the reverse channel estimate determined at block 604.

At block 616, a transmit beamforming vector, i.e., a beamforming vector for transmitting via the forward channel, is determined based on the forward channel estimate determined at block 612.

At block 620, a plurality of communication frames that each request link quality information are generated and transmitted to the second communication device. Each of the communication frames are transmitted using the beamforming vector determined at block 616, in an embodiment. Each of the communication frames are transmitted using a different calibration matrix (e.g., a calibration matrix to correct for transmit chain/receive chain mismatches between the forward channel and the reverse channel), in an embodiment. Each of the communication frames are generated using a method such as described with respect to FIG. 7, in an embodiment. In an embodiment, the plurality of communication frames transmitted at block 620 are transmitted using a same MCS.

At block 624, a plurality of communication frames that each include link quality information are received from the second communication device in response to the plurality of communication frames transmitted at block 620. Each of the communication frames received at block 620 are generated by the second communication device using a method such as described with respect to FIG. 8, in an embodiment.

At block 628, a calibration matrix for use in subsequent transmissions to the other communication device is determined based on the link quality information received at block 624. For example, a calibration matrix that provides a highest SNR value is selected, in an embodiment. As another example, a calibration matrix that provides a highest link margin is selected, in an embodiment. As another example, a calibration matrix that provides a highest RSSI is selected, in an embodiment. As another example, a set of calibration matrix that provide the highest SNR values, link margins, RSSIs, etc., are utilized to generate a calibration matrix, in an embodiment. The calibration matrix determined at block 512 is utilized to transmit subsequent communication frames to the second communication device.

Referring again to FIGS. 7 and 8, a communication frame that includes a request for link quality information is included in a multi user communication frame, in an embodiment. For example, in a multi user downlink transmission, corresponding control fields that include requests for link quality information are included in respective subframes corresponding to a plurality of client devices. Each client device responds with link quality information in a corresponding uplink transmission. For example, in an embodiment, the link quality information from the plurality of client devices are included in respective acknowledgment frames. As another example, in a multi user downlink transmission, a control field that includes a request for link quality information is included in an NDP announcement frame transmitted to the plurality of client devices. Each client device responds with link quality information in a corresponding uplink transmission. For example, in an embodiment, the link quality information from the plurality of client devices are included in respective acknowledgment frames.

Figure 12:
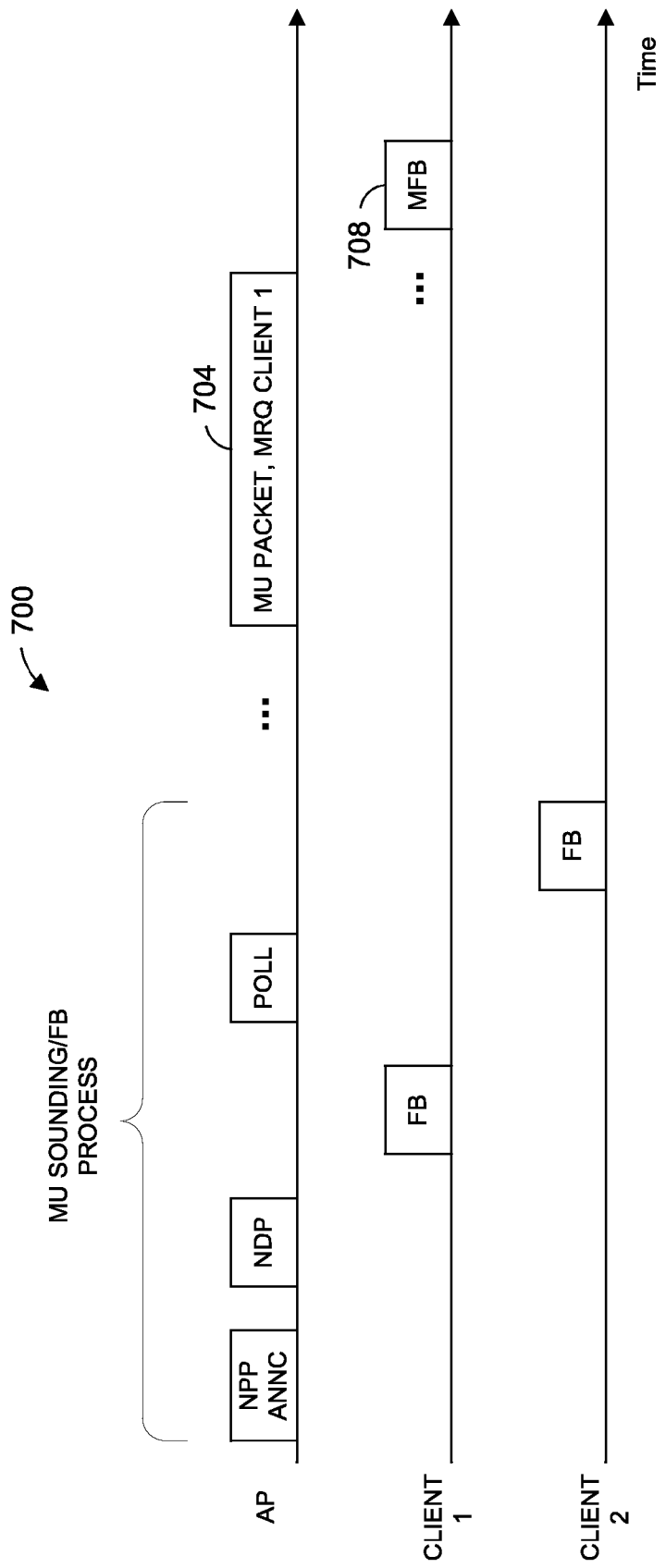
FIG. 12 is a timing diagram of an example transmission sequence in a downlink multi-user multiple input, multiple output (MIMO) context in which modulation and coding scheme (MCS) and/or link quality feedback is requested by an access point, in an embodiment.

FIG. 12 is a timing diagram 700 of an example transmission sequence in a downlink multi-user MIMO context. After a multi-user sounding/feedback process, the AP transmits a multi-user packet 704 that includes independent data for a plurality of client stations including at least a first client (Client 1) and a second client (Client 2). Independent data for the plurality of client stations is transmitted simultaneously in a suitable manner, such as on different spatial streams, in different frequency portions of the channel, etc. The packet 704 includes an indication of a request for MCS and/or link adaptation feedback, in an embodiment. The packet 704 also includes an indication of which client stations should provide the feedback. In the illustrated embodiment of FIG. 12, the packet 704 includes an indication that Client 1 should provide MCS and/or link adaptation feedback (e.g., SNR). Client 1 transmits the MFB/link adaptation feedback (e.g., SNR) in a packet 708. In an embodiment, the MFB/link adaptation feedback (e.g., SNR) is included in a control field of the packet 708. In an embodiment, the MFB/link adaptation feedback (e.g., SNR) is included in a MAC portion of the packet 708 (e.g., in a high throughput control (HTC) field). In another embodiment, the MFB is included in a control field in a PHY header portion of the packet 708.

The packet 708 is an acknowledgment packet in an embodiment. In other embodiments, the packet 708 is another suitable packet for transmitting MFB/link adaptation feedback (e.g., SNR) to the AP. For example, in an embodiment, the packet 708 is a control wrapper frame. In another embodiment, the packet 708 is a management frame.

Figure 13:
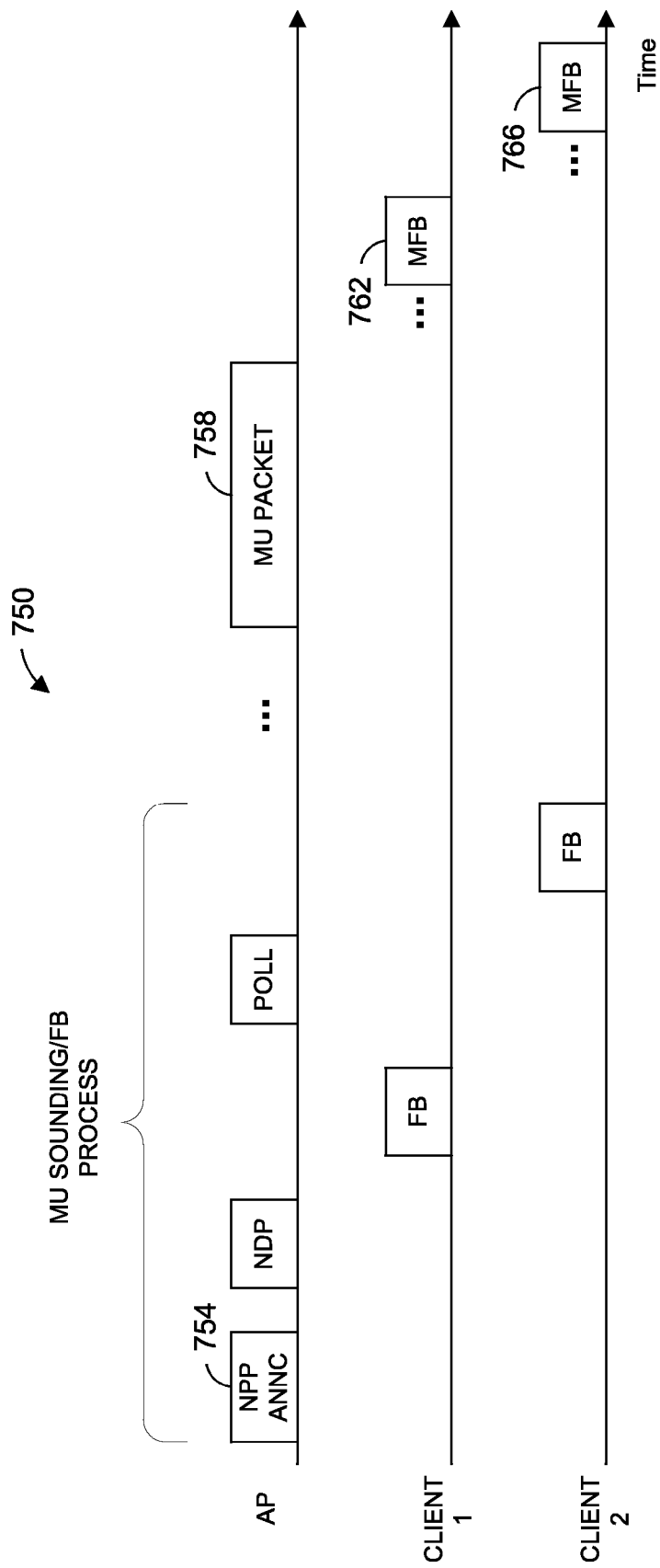
FIG. 13 is a timing diagram of another example transmission sequence in a downlink multi-user MIMO context in which MCS and/or link quality feedback is requested by an access point, in another embodiment.

FIG. 13 is a timing diagram 750 of another example transmission sequence in a downlink multi-user MIMO context. During a multi-user sounding/feedback process, the AP transmits a null data packet announcement (NDPA) packet 754. The NDPA packet 754 includes an indication of a request for MCS and/or link adaptation feedback (e.g., SNR), in an embodiment.

In an embodiment, the NDPA packet 754 indicates that all stations in the basic service set (BSS) should provide feedback. In another embodiment, the packet 754 also includes an indication of which client stations should provide feedback. In the illustrated embodiment of FIG. 13, the packet 754 includes an indication that Client 1 and Client 2 should provide MFB. For example, the indication that Client 1 and Client 2 should provide MFB is a group ID corresponding to a group of which Client 1 and Client 2 are members.

The packet 754 indicates that client stations should provide feedback in response to a subsequent multi-user downlink packet 758 transmitted after the sounding/feedback process. The packet 758 includes independent data for a plurality of client stations including at least a first client (Client 1) and a second client (Client 2). Independent data for the plurality of client stations is transmitted simultaneously in a suitable manner, such as on different spatial streams, in different frequency portions of the channel, etc.

Client 1 transmits the MFB/link adaptation feedback (e.g., SNR) in a packet 762. In an embodiment, the MFB/link adaptation feedback (e.g., SNR) is included in a control field of the packet 762. In an embodiment, the MFB/link adaptation feedback (e.g., SNR) is included in a MAC portion of the packet 762 (e.g., in a high throughput control (HTC) field). In another embodiment, the MFB is included in a control field in a PHY header portion of the packet 762.

Client 2 transmits the MFB/link adaptation feedback (e.g., SNR) in a packet 766. In an embodiment, the MFB/link adaptation feedback (e.g., SNR) is included in a control field of the packet 766. In an embodiment, the MFB/link adaptation feedback (e.g., SNR) is included in a MAC portion of the packet 766 (e.g., in a high throughput control (HTC) field). In another embodiment, the MFB is included in a control field in a PHY header portion of the packet 766.

The packets 762, 766 are acknowledgment packets in an embodiment. In other embodiments, the packets 762, 766 are other suitable packets for transmitting MFB/link adaptation feedback (e.g., SNR) to the AP. For example, in an embodiment, the packets 762, 766 are control wrapper frames. In another embodiment, the packets 762, 766 are management frames.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for link adaptation in a network, the method comprising:
    generating, at a first network interface device, a first control field to include a first subfield indicating a request for link quality information, wherein generating the first control field comprises setting a second subfield of the first control field to a value indicating that the first control field is to be interpreted according to a first communication protocol and not according to a second communication protocol, wherein the second communication protocol does not permit a request for link quality information in a communication frame i) that is not a sounding frame, and ii) that is not a frame that announces a null data packet is to follow the communication frame;
    generating, at the first network interface device, a first communication frame having a first header, wherein the first header includes the first control field,
        the first communication frame i) is not a sounding frame, and ii) is not a frame that announces a null data packet is to follow the communication frame; and
    causing, with the first network interface device, the first communication frame to be transmitted in order to prompt a communication device that conforms to the first communication protocol to send link quality information.

2. A method according to claim 1, wherein generating the first control field further comprises setting a third subfield to indicate whether the first communication frame is a single user frame or a multi user frame, and
    wherein generating the first communication frame comprises i) generating the first communication frame as a single user frame when the third subfield is set to indicate a single user frame, and ii) generating the first communication frame as a multi user frame when the third subfield is set to indicate a multi user frame.

3. A method according to claim 1, wherein the header is a media access control (MAC) header of a MAC protocol data unit.

4. A system comprising:
    a first network interface device configured to
        generate a first control field to include a first subfield indicating a request for link quality information;
        set a second subfield of the first control field to a value indicating that the first control field is to be interpreted according to a first communication protocol and not according to a second communication protocol, wherein the second communication protocol does not permit a request for link quality information in a communication frame i) that is not a sounding frame, and ii) that is not a frame that announces a null data packet is to follow the communication frame; and
        generate a first communication frame having a first header, wherein
            the first header includes the first control field, and
            the first communication frame i) is not a sounding frame, and ii) is not a frame that announces a null data packet is to follow the communication frame,
    wherein the first network interface device is further configured to cause the first communication frame to be transmitted in order to prompt a communication device that conforms to the first communication protocol to send link quality information.

5. A system according to claim 4, wherein the first network interface device is configured to set a third subfield to indicate whether the first communication frame is a single user frame or a multi user frame, and
wherein the first network interface device is configured to i) generate the first communication frame as a single user frame when the third subfield is set to indicate a single user frame, and ii) generate the first communication frame as a multi user frame when the third subfield is set to indicate a multi user frame.

6. A system according to claim 4, wherein the first header is a media access control (MAC) header of a MAC protocol data unit.

7. A system according to claim 6, wherein
the first network interface device includes a media access control (MAC) processing unit,
the MAC processing unit is configured to generate the first control field,
the MAC processing unit is configured to generate the MAC header, and
the MAC processing unit is configured to generate the MAC protocol data unit.

8. A system according to claim 6, wherein
the first network interface device includes a physical layer (PHY) processing unit, and
the PHY processing unit is configured to generate the first communication frame to include the MAC protocol data unit.

9. A method according to claim 1, further comprising:
determining, at a second network interface device, a link quality metric corresponding to a wireless communications link between a first communication device and a second communication device;
generating, at the second network interface device, a second communication frame having a second header, wherein the second header includes
i) a fourth subfield of a second control field to specify a modulation and coding scheme for use via the wireless communications link,
ii) a fifth subfield of the second control field that includes the link quality metric; and
causing, with the second network interface device, the second communication frame to be transmitted.

10. A method according to claim 9, wherein the link quality metric comprises at least one of i) a signal to noise ratio (SNR), ii) a received signal strength indicator (RSSI), and iii) a link margin metric.

11. A method according to claim 9, further comprising:
determining, at the second network interface device, the modulation and coding scheme; and
including, at the second network interface device, an indication of the determined modulation and coding scheme in the fourth subfield.

12. A method according to claim 9, further comprising setting, at the second network interface device, the fourth subfield to a value indicating modulation and coding scheme feedback is not available.

13. A system according to claim 4, comprising:
a second network interface device configured to
determine a link quality metric corresponding to a wireless communications link between the second network interface and another communication device, and
generate a second communication frame having a second header, wherein the second header includes
i) a fourth subfield of a second control field to specify a modulation and coding scheme for use via the wireless communications link, and
ii) a fifth subfield of the second control field that includes the link quality metric;
wherein the second network interface device is further configured to cause the second communication frame to be transmitted.

14. A system according to claim 13, wherein the link quality metric comprises at least one of i) a signal to noise ratio (SNR), ii) a received signal strength indicator (RSSI), and iii) a link margin metric.

15. A system according to claim 13, wherein the second network interface device is further configured to:
determine the modulation and coding scheme; and
include an indication of the determined modulation and coding scheme in the fourth subfield.

16. A system according to claim 13, wherein the second network interface device is further configured to set the fourth subfield to a value indicating modulation and coding scheme feedback is not available.

* * * * *